United States Patent
Sinclair

(10) Patent No.: US 9,038,446 B1
(45) Date of Patent: May 26, 2015

(54) SYSTEM AND METHOD FOR AN AUTOMOTIVE ENGINE TORQUE SENSOR

(71) Applicant: Larry D. Sinclair, Chino Valley, AZ (US)

(72) Inventor: Larry D. Sinclair, Chino Valley, AZ (US)

(*) Notice: Subject to any disclaimer, the term of this patent is extended or adjusted under 35 U.S.C. 154(b) by 0 days.

(21) Appl. No.: 14/073,813

(22) Filed: Nov. 6, 2013

(51) Int. Cl.
*G01L 3/00* (2006.01)
*B60K 5/12* (2006.01)
*G01M 15/04* (2006.01)
*F16F 15/027* (2006.01)

(52) U.S. Cl.
CPC ........... *B60K 5/1283* (2013.01); *G01M 15/044* (2013.01); *F16F 15/027* (2013.01)

(58) Field of Classification Search
CPC ... B60K 5/1283; F16F 15/027; G01M 15/044
USPC .......................................... 73/114.15, 862.29
See application file for complete search history.

(56) References Cited

U.S. PATENT DOCUMENTS

| | | | | |
|---|---|---|---|---|
| 3,164,986 | A | * | 1/1965 | Krueger ..................... 73/862.29 |
| 3,957,128 | A | * | 5/1976 | Le Salver et al. ............. 180/291 |
| 4,313,341 | A | * | 2/1982 | Yamaguchi et al. ....... 73/862.29 |
| 4,537,275 | A | * | 8/1985 | Kimura et al. ................ 180/300 |
| 4,664,219 | A | * | 5/1987 | Hoerig et al. ................. 180/291 |
| 4,762,306 | A | * | 8/1988 | Watanabe et al. ............. 267/195 |
| 4,813,513 | A | * | 3/1989 | Le Salver et al. ............. 180/291 |
| 4,869,474 | A | * | 9/1989 | Best et al. ..................... 267/136 |
| 5,255,646 | A | * | 10/1993 | Inagaki et al. ............. 123/192.1 |
| 5,439,204 | A | * | 8/1995 | Yamazoe et al. ......... 267/140.14 |
| 7,353,697 | B2 | * | 4/2008 | Akkerman et al. ........ 73/117.03 |
| 7,923,955 | B2 | * | 4/2011 | Shin et al. ..................... 318/611 |
| 2010/0198457 | A1 | * | 8/2010 | Hermann et al. ............... 701/36 |

* cited by examiner

*Primary Examiner* — Freddie Kirkland, III
(74) *Attorney, Agent, or Firm* — Alford Law Group, Inc; Vy H. Vu

(57) ABSTRACT

The disclosure relates to a method and apparatus of measuring torque. The method and apparatus entails measuring the torque generated by an automobile engine using a torque sensor replacing the driver side engine mount. A spring component of the torque sensor tares the weight of the engine and a hydraulic pressure gauge measures the lifting forces acting on a pressure receiver of the torque sensor.

20 Claims, 6 Drawing Sheets

SYSTEM AND METHOD FOR AN AUTOMOTIVE ENGINE TORQUE SENSOR

FIELD

This invention is generally related to a torque sensor and specifically related to an automotive engine torque sensor.

BACKGROUND

It is often quoted that "horsepower sells cars". A stronger car with more horsepower is generally preferred over a weaker alternative with less horsepower. Horsepower is a unit of measure often cited in the automotive industry especially in high performance cars. The definition of one horsepower is 33,000 foot-pounds per minute. Horsepower is an important engine parameter but an engine's horsepower is not directly measured. Horsepower is derived from other measurable forces.

One method of determining horsepower measures the torque produced by an engine and converts the torque to horsepower by the equation HP=Torque×R.P.M.÷5252. To directly measure torque, a dynamometer may be coupled to an engine. The dynamometer places a load on the engine and measures the amount of torque that the engine can produce against the load.

A typical dynamometer comprises a rotor and housing. A load is placed on the engine by some braking means on the rotor. Different braking means include dry friction brake, hydraulic brakes, electromagnetic brakes. Modern dynamometer may include processors to convert the measured torque to horsepower.

One disadvantage of measuring torque using a dynamometer is the cost. An engine dynamometer may cost upwards of $50,000 U.S.D. Furthermore, coupling an engine to a dynamometer may be labor and time intensive. Attaching the engine to the rotor of a dynamometer may require the removal of the engine or at least partial disassembly to connect the engine to the dynamometer rotor.

Although horsepower sells cars, in some sense, torque is more important than horsepower. Torque is what a actually driver feels during acceleration, while horsepower is an esoteric arbitrary measurement. Horsepower isn't particularly meaningful from a driver's perspective, and the two numbers only coincide at 5252 rpm, where horsepower and torque are equal in magnitude.

Hot rod enthusiasts are especially interested in measuring the torque of their engines. Hot rod enthusiasts measure torque because, from a driver's perspective, a car will accelerate at a rate that matches its torque curve. A car will accelerate hardest at its torque peak in any given gear, and will not accelerate as hard below that peak, or above it. Peak torque is a "sweet spot" for performance.

What is needed is an onboard method and device for measuring torque generated by an automotive engine. What is needed is a method of measuring automotive engine torque without needing to remove the engine from the car as required by a dynamometer.

SUMMARY

An aspect of this invention is generally related to a method and apparatus of measuring torque and specifically related to a method and apparatus of measuring automotive engine torque using a hydraulic pressure gauge.

In an automobile engine rotational motion of the crankshaft causes an opposite torque reaction. Embodiments of the invention generally measures lifting forces caused by the torque reaction at a point approximately 1 foot from the crankshaft.

Engines are generally mounted to the frame of the automobile by two or more engine mounts. Embodiments of the invention generally replaces one of the engine mounts, preferably the driver side engine mount, with a torque sensor with one or more springs to support the weight of the engine. A hydraulic pressure gauge measures the lifting forces exerted on a pressure receiver by the rotation of the engine crankshaft.

This summary was provided to efficiently present the general concept of the invention and should not be interpreted as limiting the scope of the claims.

DETAILED DESCRIPTION OF THE EXEMPLARY EMBODIMENTS

A method and an apparatus to provide an automobile engine torque sensor are described below. In the following description, numerous specific details are set forth. However, it is understood that embodiments of the invention may be practiced without these specific details. In other instances, well-known components, structures, and techniques have not been shown in detail in order to not obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
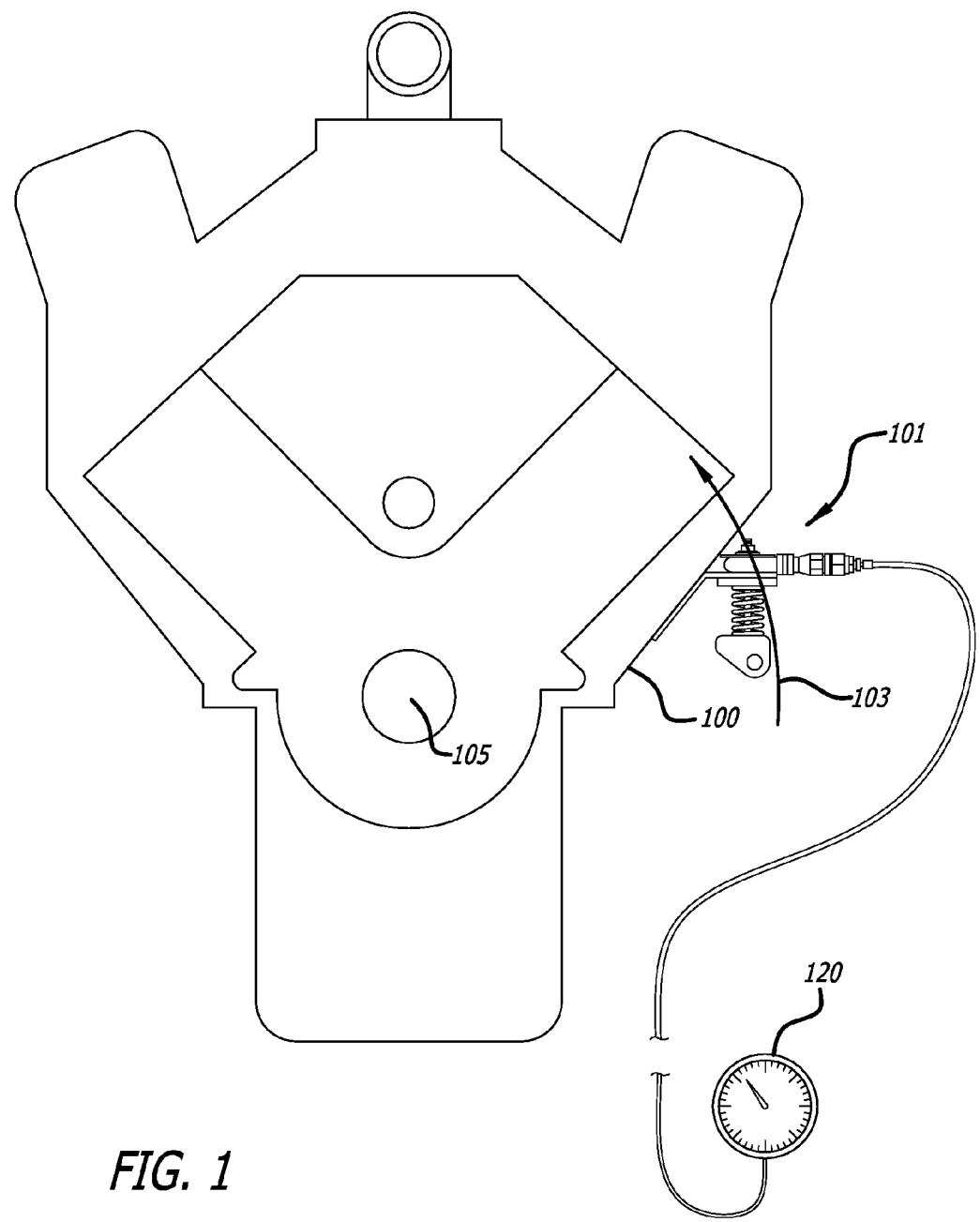
FIG. 1 illustrates a front view of an automobile engine with an exemplary torque sensor attached to the driver side of the engine block.

FIG. 1 illustrates a front view of an automobile engine with an exemplary torque sensor attached to the driver side of the engine block 100. Certain details of the exemplary automobile engine namely, the valve cover and crank shaft depicted in the illustration are shown to provide familiar references to those of ordinary skill in the art of automobile engines. The exact position for these reference items may not be the same on every automobile engine.

In FIG. 1 the torque sensor 101 is mounted on the right side of the engine block 100 as seen from a frontal view of the engine. For the purpose of this application, the right side as seen in this illustration will be referred to as the driver side. Clockwise rotational motion of the crankshaft causes an opposing torque reaction in a counterclockwise direction as indicated by directional arrow 103. In FIG. 1 directional arrow 103 passes through torque sensor 101 to indicate that the torque reaction is being measured at torque sensor 101. Torque sensor 101 is mounted on the driver side of the exemplary engine. Generally torque sensor 101 may be bolted directly to the engine block. A dial gauge 120 displays the measurements taken by torque sensor 101.

Figure 1A:
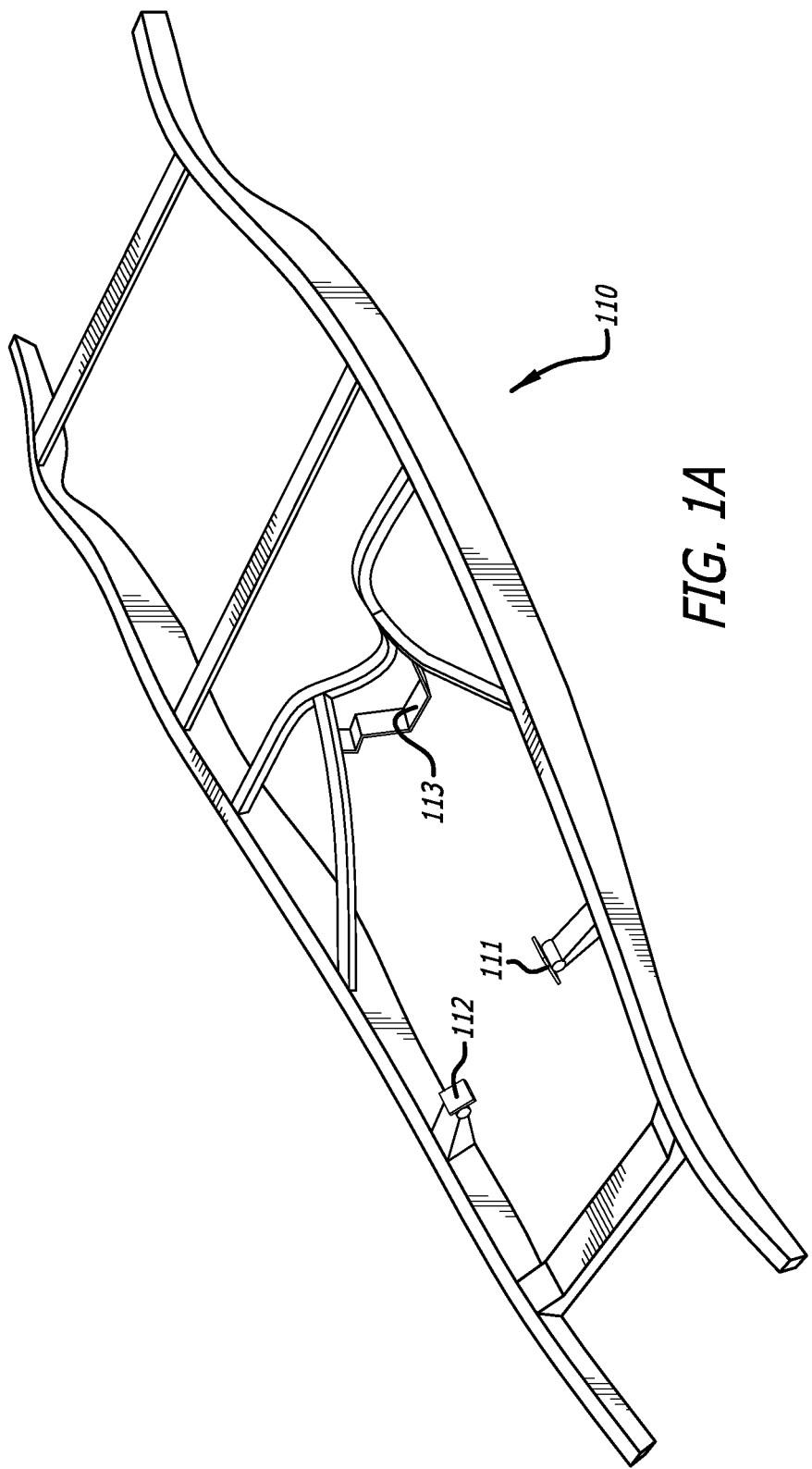
FIG. 1A is perspective view of an exemplary hotrod chassis as viewed from the front right.

Hot rod engines are generally mounted on a rigid steel chassis. Referring momentarily to FIG. 1A, a right front perspective view of a stripped down chassis 110 is illustrated. The engine is generally mounted on two front mounts 111 and 112 and one rear mount 113. Generally, the engine's center of gravity is located between the front and rear mounts.

Referring back to FIG. 1, in most automobile engines especially in North America, the engine crankshaft rotates clockwise. The crankshaft's clockwise rotation creates a reaction torque in the opposite direction (counter clockwise) as illustrated by directional arrow 103. This counterclockwise torque reaction 103 creates a lifting force on the left front mount 111 and compressive forces on the right front mount 112. The rear mount receives very little torque reaction due to its position along the same axis as the crankshaft. Therefore, for purpose of this invention, the torque on the rear mount may be ignored. By measuring the lifting force at the left front mount 111, engine torque may be measured directly.

One advantage of measuring the lifting forces on the left front mount 111 is that generally, the front mounts are spaced about 1 foot from the crankshaft of the engine. In imperial units, torque is measured in "pound-force-feet" (lb·ft). The 1 foot spacing between the crankshaft and the engine mount 112 simplifies conversion and allows for direct measurement of torque using a pressure gauge calibrated in Pounds per Square Inch (P.S.I).

Figure 2:
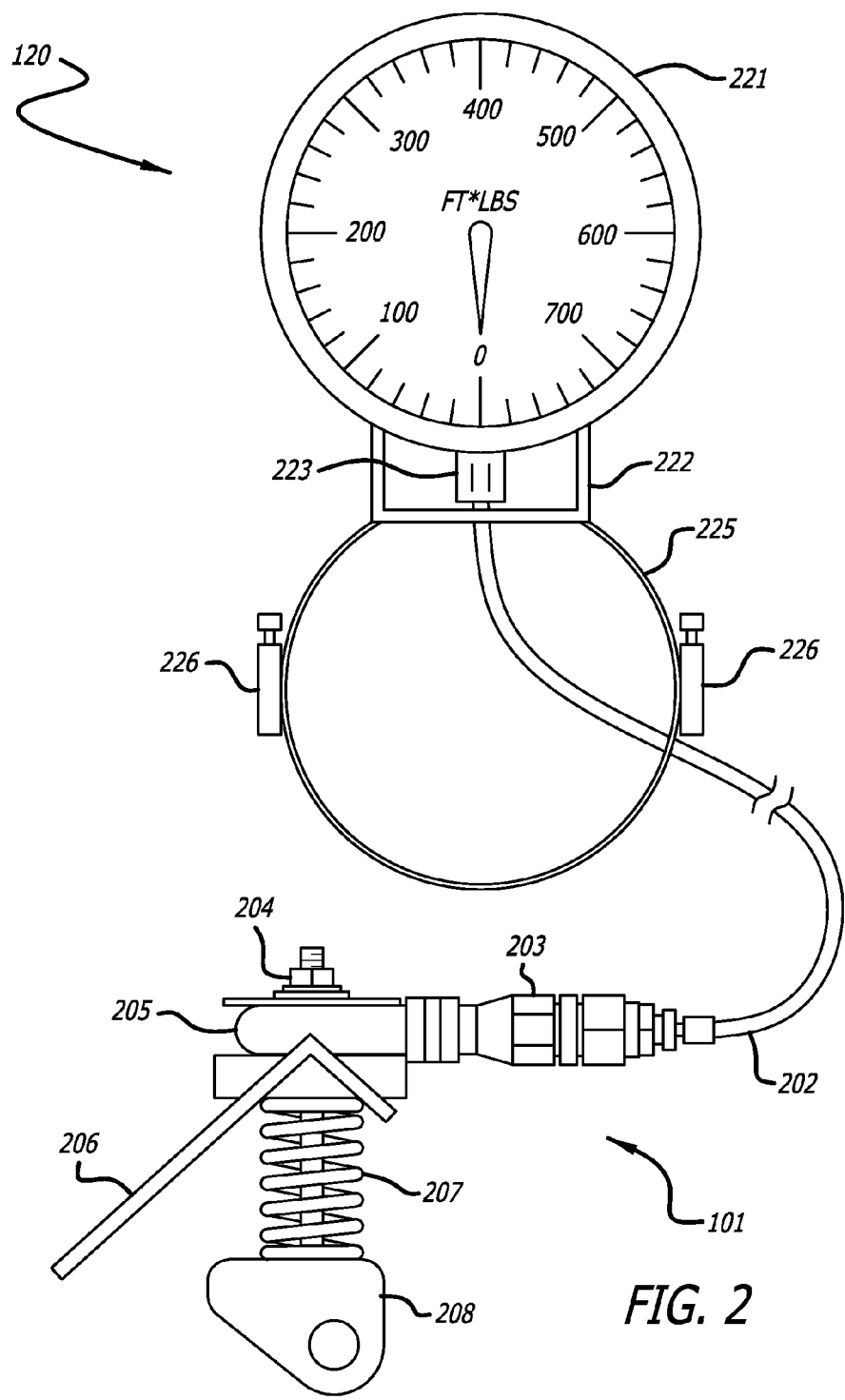
FIG. 2 illustrates a close-up side view of the exemplary torque sensor with a front view of an exemplary pressure gauge attached.

FIG. 2 illustrates an exemplary embodiment of the engine torque sensor 101 and torque sensor gauge 120. Starting from the bottom, the engine torque sensor 101 comprises a bracket 208, spring 207, mounting plate 206, pressure receiving loop 205, fastener 204, and pressure fittings 203.

An exemplary torque sensor gauge 120 is illustrated in the upper half of FIG. 2. The torque sensor gauge 120 is comprised of; a dial 221, oil line coupler 223, support base 222, oil line 202, mounting ring 225, and dual size adjusters 226. In this exemplary embodiment, dial 221 is calibrated in foot-pound (ft·lb) In the United States, foot-pound is often used as a unit of torque in place of the Pound-foot (lb·ft).

One advantage of the exemplary torque sensor gauge 120 is that dial 221 can be made from a standard pressure gauge measuring pounds per square inch (P.S.I). In the exemplary embodiment oil line 202 is filled with incompressible liquid e.g. mineral oil. The area of the pressure receiving loop 205 is approximately 1 inch square. The pressure receiving loop 205 is also approximately 1 foot from the crankshaft. Thus lb/in$^2$·1 in$^2$·1 ft=lb·ft (torque). In preferred embodiments, pressure receiving loop 205 is a hydraulic pressure receiver. Pressure receiving loop 205 is filled with incompressible liquid and is hydraulically connected to a pressure gauge.

Torque sensor gauge 120 may include a base 222 and a mounting ring 225 to affix the torque sensor gauge in a visible location. Size adjusters 226 on mounting ring 225 can be used to reduce the size of the mounting ring. Mounting ring 225 may be a type of screw band hose clamps which may be placed around a steering column and tightened to hold the torque sensor gauge 220 in a visible location during vehicle operation.

Typically, hotrod engine torque is approximately 300-350 ft·lbs. Due to the large amount of force placed on the oil receiving loop 205, care should be made in selecting fittings and hydraulic lines that can withstand the oil pressure. Certain specialized hotrod engines may exceed 1500 ft·lbs of torque. Thus oil line coupler 223, oil line 202, and oil line fitting 203, should be selected to withstand the max torque/P.S.I with a margin of safety. In some embodiments of the invention, fitting 203 are aluminum aircraft pressure fittings and oil line 202 has a durable braided metal outer layer to withstand higher P.S.I. In the exemplary embodiment the torque sensor gauge 120 is calibrated to 700+ P.S.I so that normal hot rod engine torque will register at the approximate middle of the dial. A higher torque engine would require a higher max P.S.I torque sensor gauge 120.

Figure 3:
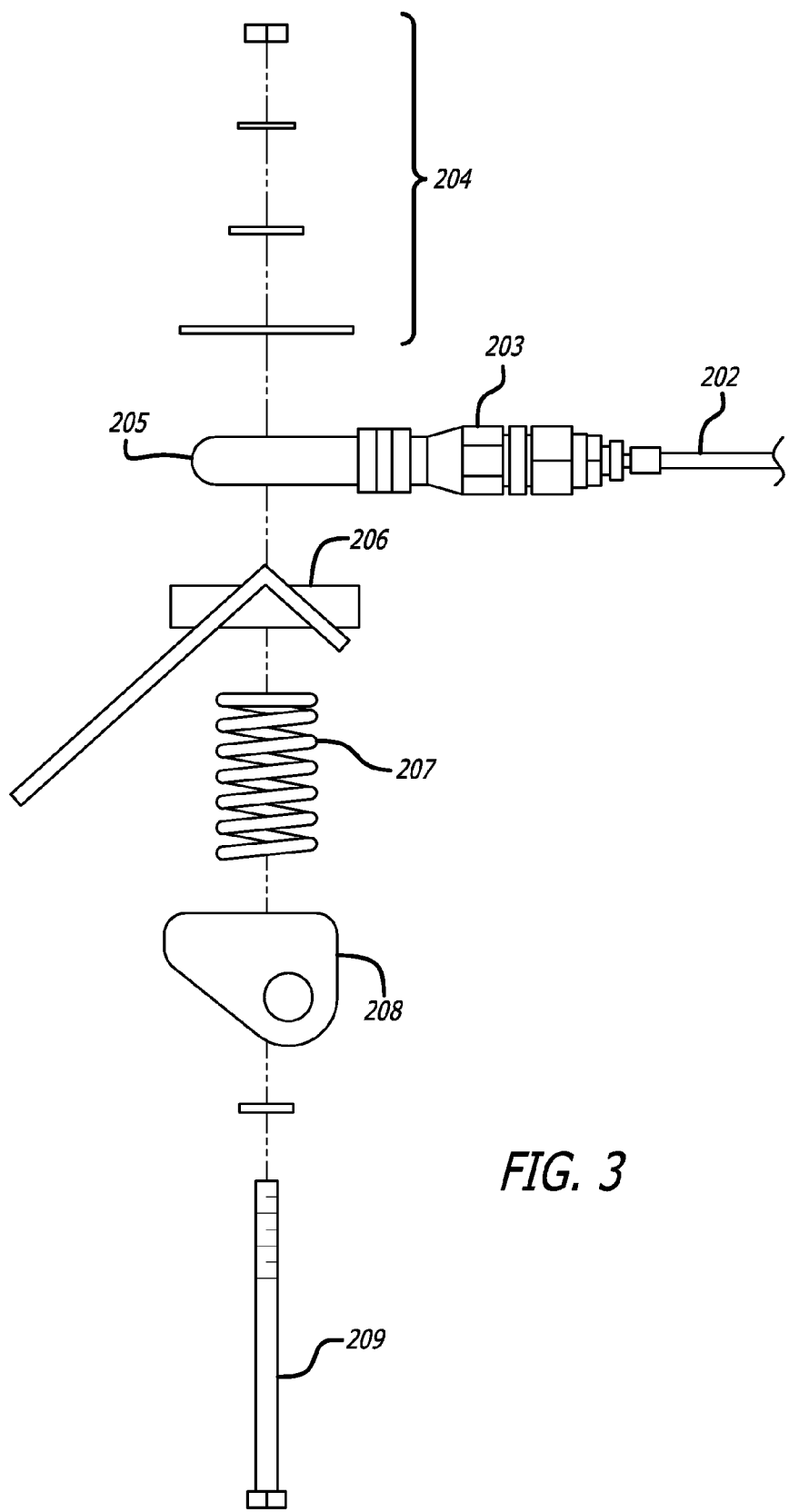
FIG. 3 illustrates an exploded view of the exemplary torque sensor.

The components of the exemplary engine torque sensor 101 may be better described with reference to FIG. 3 illustrating an exploded view of engine torque sensor 101. Mounting bracket 208 attaches to a hot rod chassis. A bolt (not shown) slides through the circular opening in mounting bracket 208 and locks the bracket to the hot rod chassis. A spring 207, is held between mounting bracket 208 and mounting plate 206. Typically mounting plate 206 is bolted directly to the engine block. Typical engine blocks 100 have raised mounting holes to receive the bolts of mounting plate 206. Different engines and mounting plates may have different bolt configurations. Embodiments of the invention may use one, two, three or more bolts without changing the inventive concept. The spring 207 is held in place by bolt 209 that thread through the bottom of mounting bracket 208, through spring 207, through pressure receiving loop 205, and is capped by fastener 204.

By experimentation, it has been found that spring 207 is optimally 1 inch high with a restoring force sufficient to support approximately 250 pounds. Spring 207 suspends the weight of the engine so that the engine weight does not affect the engine torque measurement. Spring 207 is selected such that the restoring force of spring 207 is sufficient to balance the weight of the engine. Ideally, spring 207 acts to tare the weight of the engine so that the forces acting on pressure receiving loop 205 is substantially zero when the engine is not running.

Mounting plate 206 is rigidly fixed to the engine block and receives the weight of the engine on the side that it is mounted. The engine weight placed on mounting plate 206 compresses spring 207. In a preferred embodiment, the portion of mounting plate 206 that contacts spring 207 is substantially flat so that spring 207 compresses evenly. Together, mounting bracket 208 and mounting plate 206 for a mounting means for attaching the torques sensor 101 to the chassis 110 and engine of the hotrod.

Pressure receiving loop 205 rests atop the substantially flat portion of mounting plate 206 above spring 207. Fastener 204 secures pressure receiving loop 205 to mounting plate 206. In one embodiment of the invention fastener 204 comprise a nut and plurality of washers.

Fastener 204 couples the components of the engine torque sensor 101 together but does not place measurable pressure on pressure receiving loop 205. The fastener 204 is tightened only enough to secure the pressure loop 205 to the other components without causing the pressure receiving loop 205 to register any measurable pressure.

In the exemplary embodiment, the substantially flat portion of mounting plate 206 and the bottom washer of fastener 204 provide substantially flat surfaces in contact with pressure receiving loop 205. It may be advantageous to use substantially flat contact surfaces in order to evenly distribute the force on pressure loop 205 during torque measurement. For similar reasons, it may also be advantageous for the contact surfaces to be of equal or greater size than the diameter of pressure receiving loop 205.

In operation, torque reaction 103 to the rotational motion of the crankshaft 105 causes the engine block to lift on the driver side. The engine block is securely attached to mounting plate 206, thus causing the mounting plate 206 to push up against the pressure receiving loop 205. Pressure receiving loop 205 is constrained by fastener 204 which is held immobile by connection to mounting bracket 208 (and chassis 110) through bolt 209. Pressure receiving loop 205 is effectively being squeezed between the mounting plate 206 and fastener 204.

Figure 5:
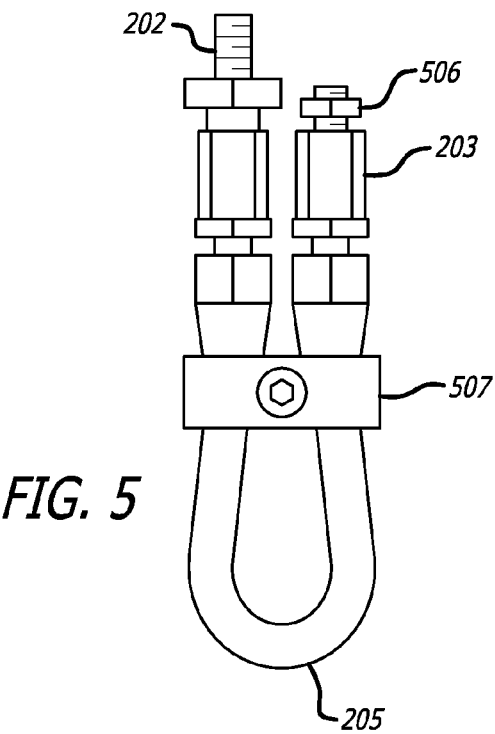
FIG. 5 illustrates a top view of the pressure receiving loop of embodiments of the torque sensor.

Referring now to FIG. 5, a top view of an exemplary pressure receiving loop 205 is illustrated. The pressure receiving loop 205 may be made of a rubber hollow rubber tube affixed to hydraulic aircraft fittings 203 to connect the hollow rubber tube to oil line 202. The end of the of the hollow rubber tube not connected to the oil line 202 is capped to form a capped end 506. By experimentation it was found that approximately six inches of ¾ inch rubber tubing forms a loop with an area of 1 in² including excess rubber tubing needed to form connections with the hydraulic aircraft fitting 103.

The two ends of the hollow rubber tube are held together by bracket 507 such that the hollow rubber tube forms a pressure receiving loop 205. Pressure receiving loop 205 is formed as a loop in the exemplary embodiment but it should be understood that any shape with an area of approximately 1 in² would suffice as a pressure receiver.

The rotational motion of the engine squeezes the 1 in² area of pressure receiving loop 205. The force of the squeeze registers on the hydraulic pressure gauge 120. Because the area of the pressure receiving loop being squeezed is 1 in² and because the distance from the pressure receiving loop 205 to the crankshaft 105 is 1 ft, torque may be read directly from the dial 221 of the torque sensor gauge 120.

Figure 4:
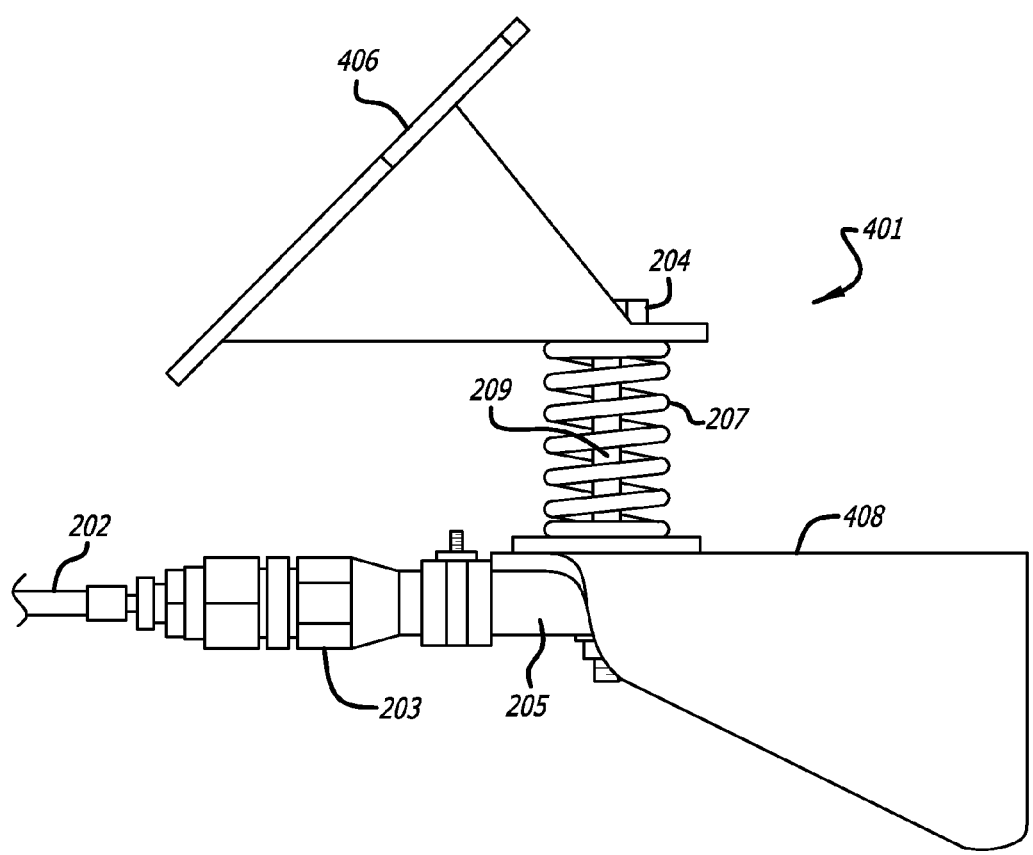
FIG. 4 illustrates a close-up side view of an alternate means of mounting an exemplary torque sensor.

Referring back to FIG. 4, a side view of another exemplary embodiment of a torque sensor 401 is illustrated. From top down, the torque sensor 401 includes many of the same components found in the previously described torque sensor 101. Mounting plate 406, fastener 204, spring 207, bolt 209, mounting plate 408, receiving loop 205, and hydraulic fitting 203, and oil line 202.

Much like the previous embodiment, spring 207 support the weight of an engine resting on mounting plate 406. In this embodiment, however, pressure receiving loop 205 and attached, hydraulic fitting 203, and oil line 202 are coupled by bolt 209 underneath mounting bracket 408. The operating principle is still substantially the same, however. Spring 207 supports the weight of the engine so that the engine weight does not affect torque measurement. At rest, when the engine is not running, forces acting on the pressure receiving loop 205 is substantially zero. When the engine is running, engine torque reaction lifts up on mounting plate 406, which in turn lifts up on bolt 209 and squeezes pressure receiving loop 205 against the bottom of mounting bracket 408. Mounting bracket 408 is rigidly coupled to the vehicle chassis and for the purposes of this invention, essentially immovable. Thus engine torque may be measured by the squeezing force acting on the pressure receiving loop 205.

Figure 6:
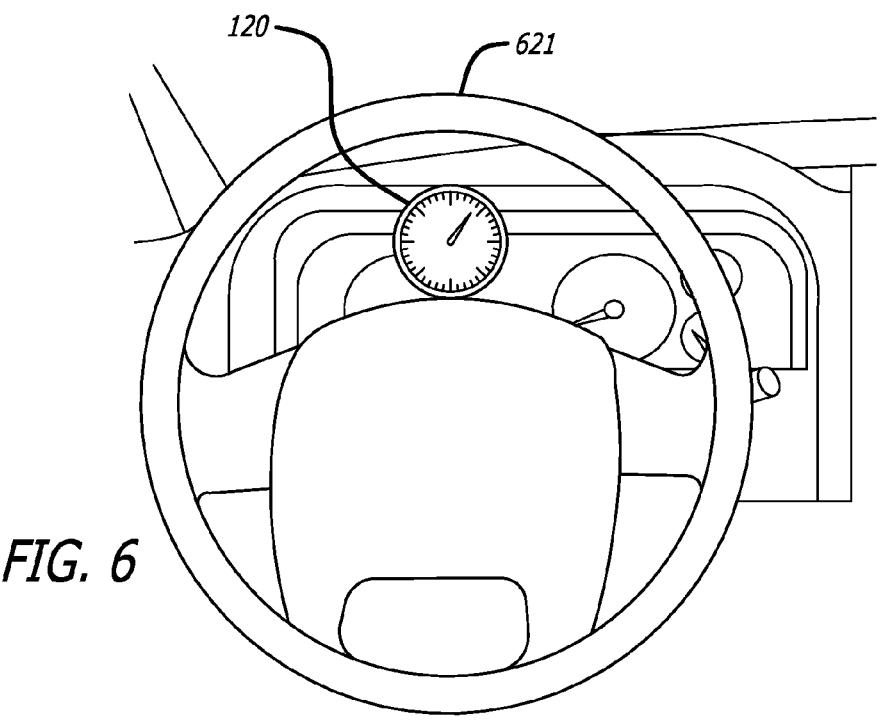
FIG. 6 illustrates a view of an exemplary automobile dashboard with an exemplary pressure gauge attached.

The force squeezing the pressure receiving loop 205 may be read on a torque sensor gauge 120. In FIG. 6, the torque sensor gauge 120 is attached to the steering column of the vehicle and visible above the steering wheel 621. An advantage of embodiments of the invention is the ability to measure the torque of the engine without having to remove the engine from the vehicle to connect the engine to a dynamometer.

In previously depicted embodiments of the invention, the torque sensor gauge 120 has been illustrated as a dial. It should be clear that instead of a dial, the hydraulic pressure/torque may be displayed in various formats. For example the torque may be displayed numerically or as a scale on an L.E.D. or L.C.D. screen. An example of a scale may be a series of bars of increasing size that corresponds to the increase in torque measured.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. An automotive engine torque sensor system comprising;
    a mounting plate adapted to attach to an automotive engine;
    a mounting bracket coupled at one end to the mounting plate and attached at an opposite end to a chassis of an automobile;
    a spring between the mounting bracket and mounting plate, the spring adapted to tare the weight of the engine;
    a torque gauge including a pressure receiver coupled to the mounting plate for measuring lifting forces acting on the pressure receiver.

2. The automotive engine torque sensor system of claim 1, wherein the torque gauge is a hydraulic pressure gauge.

3. The automotive engine torque sensor system of claim 1, wherein the pressure receiver is mounted approximately one foot from a crankshaft.

4. The automotive engine torque sensor system of claim 1, wherein the pressure receiver is a hollow rubber tube filled with a liquid.

5. The automotive engine torque sensor system of claim 4, wherein the liquid is mineral oil.

6. The automotive engine torque sensor system of claim 4, wherein the area of the pressure receiver receiving external forces acting on the pressure receiver is approximately 1 inch squared.

7. The automotive engine torque sensor system of claim 1, wherein the pressure receiver is mounted on a side of the engine lifted by torque reaction force.

8. A method of measuring automotive engine torque, comprising:
    replacing a driver side engine mount with an engine torque sensor system, including a spring and a hydraulic pressure receiver connected to a pressure gauge;
    suspending the weight of the engine with the spring to tare the weight of the engine;
    measuring lifting forces exerted on the hydraulic pressure receiver by engine torque reaction.

9. The method of claim 8, wherein the hydraulic pressure receiver is a hollow rubber tube filled with a liquid.

10. The method of claim 9, wherein the liquid is mineral oil.

11. The method of claim 8, wherein the hydraulic pressure receiver is mounted approximately one foot from a crankshaft.

12. The automotive engine torque sensor system of claim 8, wherein the area of the hydraulic pressure receiver is approximately 1 inch squared.

13. The automotive engine torque sensor system of claim 8, wherein the hydraulic pressure receiver is mounted on a side of the engine lifted by torque reaction force.

14. An automotive engine torque sensor system comprising;
    an engine torque sensor further comprising
        a first mount for attaching a first end of the engine torque sensor to an engine;

a second mount for attaching a second end, opposite the first end, of the engine torque sensor to a chassis of an automobile;

a spring between the first and second mounts, the spring adapted to tare the weight of the engine;

a hydraulic pressure receiver coupled to the second mount adapted to measure lifting forces acting on the hydraulic pressure receiver;

an oil filled line connected at a first end to the hydraulic pressure receiver;

a hydraulic pressure gauge connected at a second end of the oil filled line, the hydraulic pressure gauge including a display for displaying net forces acting on the hydraulic pressure receiver.

15. The automotive engine torque sensor system of claim 14, wherein the hydraulic pressure receiver is mounted approximately one foot from a crankshaft.

16. The automotive engine torque sensor system of claim 14, wherein the hydraulic pressure receiver is a hollow rubber tube filled with a liquid.

17. The automotive engine torque sensor system of claim 16, wherein the liquid is mineral oil.

18. The automotive engine torque sensor system of claim 14, wherein the area of the hydraulic pressure receiver is approximately 1 inch squared.

19. The automotive engine torque sensor system of claim 14, wherein the hydraulic pressure receiver is mounted on a side of the engine lifted by torque reaction force.

20. The automotive engine torque sensor system of claim 14, wherein the display is selected from a group consisting of a dial, a digital numerical display, and a scale.

* * * * *